United States Patent [19]

Hepworth et al.

[11] 4,106,091

[45] Aug. 8, 1978

[54] INTERRUPT STATUS INDICATION LOGIC FOR POLLED INTERRUPT DIGITAL SYSTEM

[75] Inventors: Edward C. Hepworth, Apache Junction; Rodney J. Means, Tempe, both of Ariz.

[73] Assignee: Motorola, Inc., Schaumburg, Ill.

[21] Appl. No.: 792,180

[22] Filed: Apr. 29, 1977

Related U.S. Application Data

[63] Continuation of Ser. No. 550,340, Feb. 18, 1975, abandoned.

[51] Int. Cl.$^2$ .............................................. G06F 3/00
[52] U.S. Cl. .................................................. 364/200
[58] Field of Search ........ 364/200, 900, 200 MS File, 364/900 MS File

[56] References Cited

U.S. PATENT DOCUMENTS

| 3,293,612 | 12/1966 | Ling | 340/172.5 |
| 3,766,531 | 10/1973 | Cooper et al. | 340/172.5 |
| 3,818,461 | 6/1974 | Ward et al. | 340/172.5 |
| 3,863,228 | 1/1975 | Taylor | 340/172.5 |
| 3,878,513 | 4/1975 | Werner | 340/172.5 |
| 3,909,790 | 9/1975 | Shapiro et al. | 340/172.5 |
| 3,949,380 | 4/1976 | Barbour et al. | 340/172.5 |
| 3,955,180 | 5/1976 | Hirtle | 340/172.5 |
| 3,969,723 | 7/1976 | Kennicott | 340/172.5 |

Primary Examiner—Mark E. Nusbaum
Attorney, Agent, or Firm—Walter W. Nielsen

[57] ABSTRACT

An interface adaptor couples peripheral equipment to a bidirectional data bus and an address bus of a digital system. A plurality of interrupt sources are provided on such an interface adaptor circuit. A status bit in a status register of the interface adaptor is provided which contains a logical state indicative of a logical ORing of the plurality of interrupt sources on the interface adaptor circuit.

5 Claims, 4 Drawing Figures

INTERRUPT STATUS INDICATION LOGIC FOR POLLED INTERRUPT DIGITAL SYSTEM

This is a continuation, of application Ser. No. 550,340, filed Feb. 18, 1975, now abandoned.

RELATED APPLICATIONS

This application is related to assignee's copending U.S. patent applications Ser. No. 519,138 "Interface Adapter Architecture", now abandoned, Ser. No. 519,150 "Microprocessor Architecture", now abandoned, and Ser. No. 519,149 "Microprocessor System" by Bennett et al, all filed on Oct. 30, 1974, and to assignee's copending U.S. patent applications, "Logic Circuitry for Selection of Dedicated Registers", Ser. No. 550,338, now U.S. Pat. No. 4,006,457, "Asynchronous Communications Interface Adapter", Ser. No. 550,336, now U.S. Pat. No. 3,975,712, "Asynchronous Status Interlock Circuit for interface Adapter", Ser. No. 550,883, now U.S. Pat. No. 3,979,732, and "Digital System with Peripheral Control of Interface Adapter", Ser. No. 550,311, now abandoned, all by Hepworth et al.

BACKGROUND OF THE INVENTION

A large number of minicomputers are presently available. More recently, microcomputers utilizing bidirectional data busses have become available. A variety of specialized circuits in integrated circuit form have been utilized to interface between such bidirectional data busses and a variety of peripheral devices controlled by and interacting with microcomputers, such as, keyboards, printers, control displays, readers, plotters, etc. Circuits have also been provided to interface between bidirectional data busses and modems (modulator-demodulator) to allow the microcomputer to control remote equipment over a telephone line by converting data in a parallel word format to a serial word format, and supplying signals representing the serial word format to a modem which sends data over a telephone line. Such modem circuits also receive data in a serial format from a telephone line and transfer and data to an adaptor circuit which changes the data from the serial word format to a parallel word format and writes it onto the bidirectional data bus.

The MOS (metal-oxide-semiconductor) technology has been utilized to provide a microcomputer using microprocessor unit chips (MPU's) integrated on a single semiconductor chip. Integrated circuit random access memory chips (RAM) and read only memory (ROM) chips and suitable interface adapter chips for coupling the bidirectional data bus to peripheral equipment have also been provided by the MOS technology. Thereby, the power of computer data processing is made available at very low cost for use in a wide variety of industrial communications equipment. However, to take advantage of such low cost microcomputer systems to the fullest extent, it is often necessary to provide an efficient means of interfacing between the system data bus and peripheral devices which transmit and receive data asynchronously.

In the past, in order to permit communication between a bidirectional data bus and, for example, a modem, integrated circuits capable of providing both serial-to-parallel conversion for a receiving section thereof and parallel-to-serial conversion for a transmitting section thereof on a single chip, along with formatting circuitry, have been utilized. It has been necessary to provide additional complex bus interface circuitry, separate from said chip, which is capable of receiving data from and transmitting data onto the bidirectional data bus and accepting or receiving data from said chip. This has required additional semiconductor packages, lower component density of the final product, and consequently higher costs.

SUMMARY OF THE INVENTION

It is an object of this invention to provide a semiconductor chip suitable for use in a polled interrupt system having multiple interrupt sources and circuitry located in said semiconductor chip which simplifies a polling procedure for locating the active interrupt condition.

Briefly described, the invention is a semiconductor circuit including a plurality of interrupt sources and further including circuitry coupled to the interrupt sources which indicates whether any of the interrupt sources are in an active condition, indicating an interrupt condition somewhere in a system.

DESCRIPTION OF THE INVENTION

Figure 1:
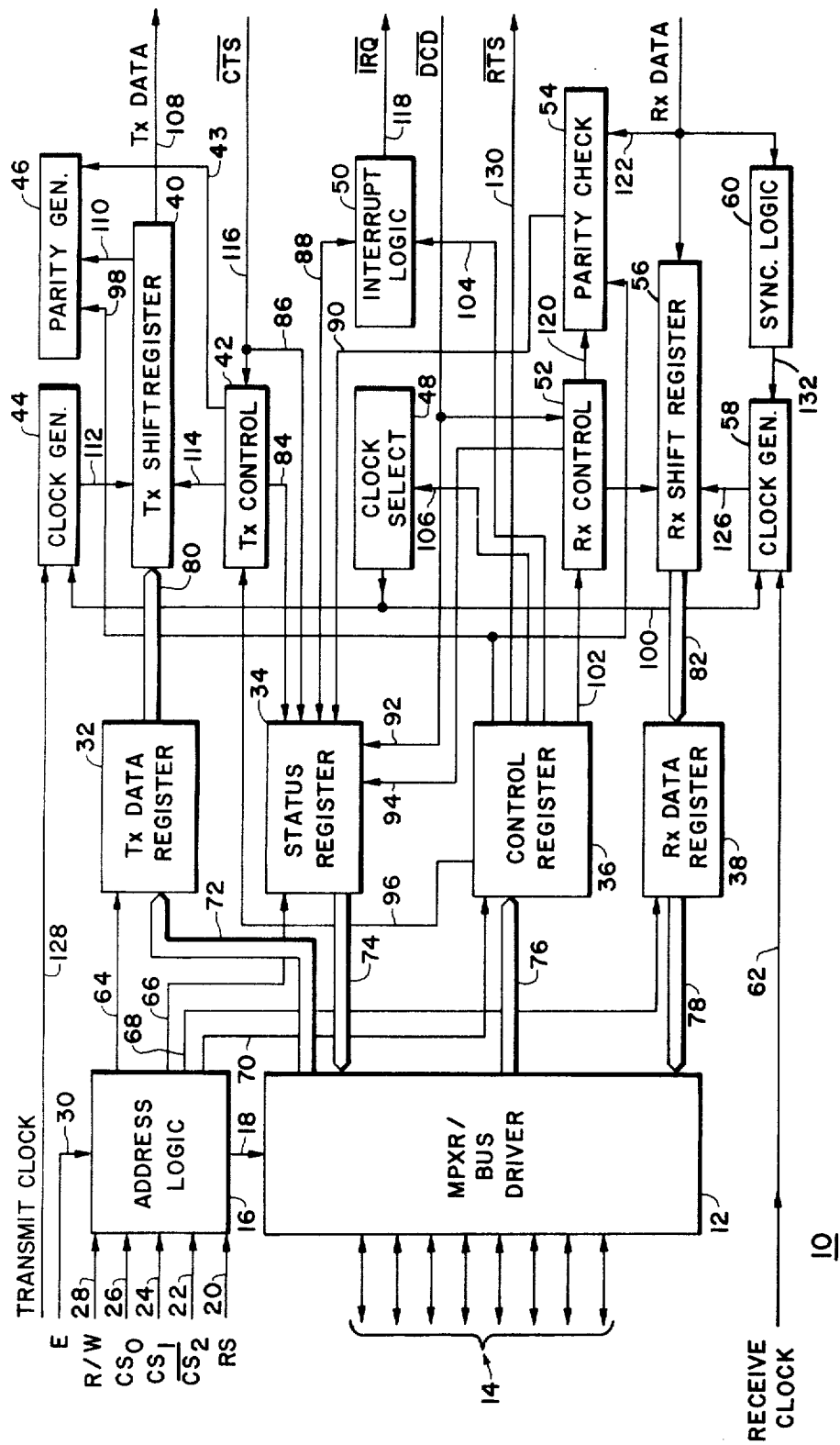
FIG. 1 is a block diagram of an asychronous communications interface adapter chip according to a presently preferred embodiment of the invention.

FIG. 1 is a block diagram of an integrated circuit version of an asynchronous interface adapter (ACIA) circuit according to the invention. ACIA chip 10 has eight bidirectional data input/output lines forming a bidirectional data bus 14 connected to multiplexor (MPXR) bus driver circuitry 12 of ACIA chip 10. Enable (E) input 30, read/write (R/W) input 28, chip select inputs 26, 24, and 22 (also designated, respectively by $CS_0$, $CS_1$, and $CS_2$) and register select (RS) input 20 are all connected to address logic circuitry 16, which is coupled to multiplexor bus driver circuitry 12 (referred to hereinafter as buffer circuitry 12) by means of one or more connections 18. In FIG. 1 the arrows indicate the usual direction of signal or data flow to or from a particular block of circuitry. Some of the solid lines are to be understood to represent a single conductor, while others may represent a plurality of separate conductors. The wide coupling elements such as by 72, 74, 76, 78, etc., represent buses which may include, for example, eight conductors for a one byte word system. The pointed ends of the buses indicate the direction of data flow and the same general format exists when the data is received or driven by bidirectional data bus 14.

ACIA chip 10 includes four internal registers, including transmit data register 32, (designated TX Data Register in FIG. 1), receive data register 38 (designated RX Data Register in FIG. 1), control register 36, the status register 34. Address logic 16 causes one of the above mentioned registers to be selected, via connections 64, 66, 68, and 70, which are also connected, respectively, to transmit data register 32, status register 34, control register 36, and receive data register 38. Transmit data register 32 is coupled to buffer circuitry 12 by means of bus 72. Status register 34 is coupled to buffer circuitry 12 by means of bus 74. Control register 36 is coupled to buffer circuitry 12 by means of bus 76. Receive data register 38 is coupled to buffer circuitry 12 by bus 78.

Transmit data register 32, which is a write only register, is connected by means of bus 80 to transmit shift register 40. Data in transmit data register 32 is shifted in parallel to shift register 40 and transmitted onto transmit data line 108 (designated TX Data) in serial format, in accordance with a clock signal being supplied on conductor 112 connected to transmit shift register 40 and to clock generator 44. The clock signal on conductor 112 is derived from input transmit clock 128. The divide ratio between the signal on conductor 128 and the signal on conductor 112 is determined by an internal control signal on conductor 100, which is connected to clock generator 44, clock generator 58, and clock select circuit 48. Parity generator circuit 46 is connected to transmit shift register 40 by means of a plurality of conductors 110 and is also connected to control register 36 by means of conductor 98. Parity generator 46 and transmitter control circuit 42 are coupled by conductor 43. Receive data register 38 is connected to receive shift register 56 by data bus 82. Data applied in serial form on receive data conductor 122 (designated RX Data), which is coupled to sync logic circuit 60, parity check circuit 54 and receive shift register 56, is loaded into receive shift register 56 in a serial format at a rate determined by a signal generated by clock generator 58 and applied to receive shift register 56 by means of conductor 126. The data is then shifted in parallel by means of bus 82 to receive data register 38.

Control register 36 stores and controls signals which control the various data transfers occurring in ACIA chip 10, and is connected to request-to-send (RTS) conductor 130, and is also connected to clock select circuitry 48 by means of conductor 106, and to interrupt logic circuitry 50 by means of conductor 104, and to receive control circuit 52 by means of conductor 102, and to transmit control circuit 42 by conductor 96.

Receiver control circuit 52 is connected by means of conductor 120 to purity check circuit 54, which is connected to control register 36 via conductor 98.

Status register 34 is, in a presently preferred embodiment of the invention, an eight bit register which stores information representative of the status of various conductors and circuits in ACIA chip 10. Status register 34 is connected to transmit control circuit 42 by means of conductor 84 and to clear to send (CTS) conductor 116 by means of conductor 86. CTS is also connected to transmit control circuit 42. Status register 34 is connected to interrupt logic circuitry 50 by means of conductor 88, and a parity check circuit 54 by means of conductor 90, and to data carrier detect loss (DCD) conductor 92, and to receiver control circuit 52 by means of conductor 94. Sync logic circuit 60 is connected to clock generator circuit 58 by means of conductor 132. Transmit control circuit 42 is connected to status register 34 by conductor 84 and to control register 36 by conductor 96. Receiver control circuit 52 is connected to status register 34 by conductor 94 and to control register 36 by conductor 102.

Figure 2:
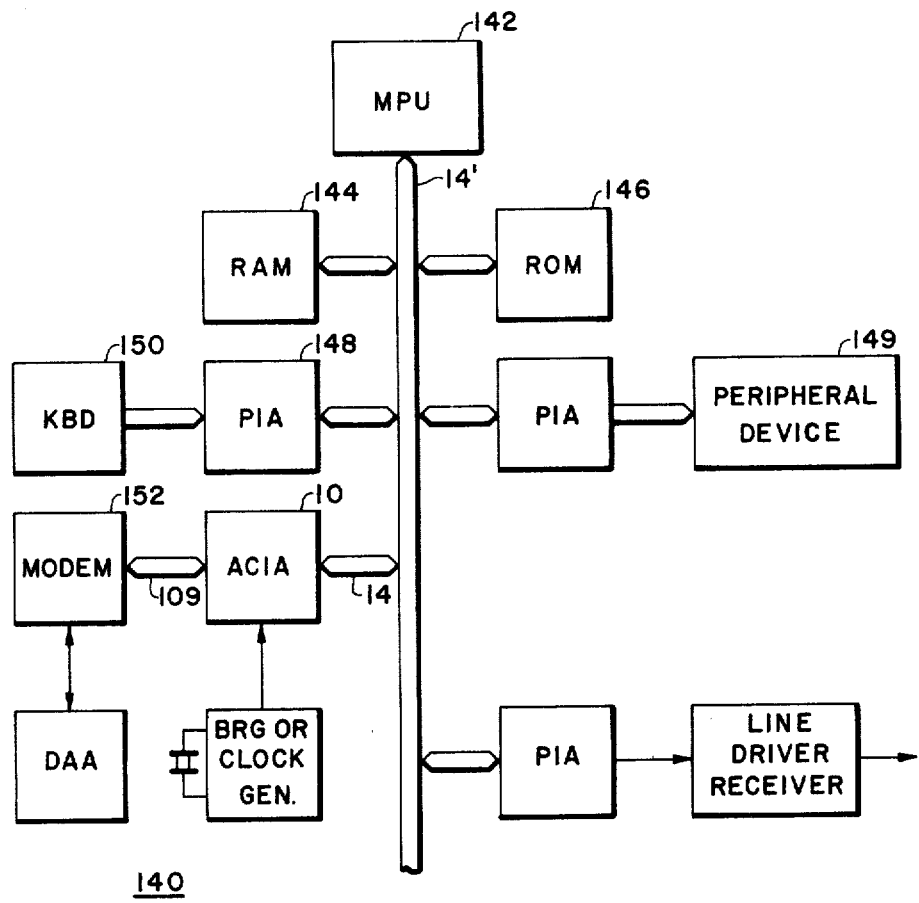
FIG. 2 is a block diagram of a microcomputer system in which the asychronous communications interface adaptor of FIG. 1 may be utilized.

FIG. 2 is a block diagram of a typical microcomputer system in which the presently preferred embodiment of the asynchronous communications interface adaptor may be utilized. Microcomputer 140 includes microprocessor chip 142, which may be as described in the above mentioned patent application Ser. No. 519,150.

Microprocessor circuit 142 is connected to a bidirectional data bus 14'. Random access memory (RAM) 144 and read only memory (ROM) 146 are connected, respectively, by means of their data bus lines, to the data conductors which constitute bidirectional data bus 14'. A plurality of peripheral interface adaptor chips 148 are connected by means of their bidirectional data input/output conductors to the respective conductors of data bus 14'. (It will be understood that chips 142, 148, 10, etc. may be packaged in suitable semiconductor packages, such as dual-in-line packages). An exemplary peripheral interface adaptor is described in detail in copending patent application Ser. No. 519,138 mentioned above. A peripheral interface adaptor unit such as 148 may be utilized to couple peripheral devices such as key board 150 to data bus 14' to allow microprocessor 142 to communicate therewith. Peripheral interface adaptors may also be used to couple other peripheral devices, such as teletypes (TTY), cathode ray tubes (CRT), control panels, cassettes, etc., designated in FIG. 2 by reference numeral 149.

ACIA chip 10, as shown in FIG. 1, may be connected by means of data bus 14 to microcomputer data bus 14'. A modem 152 may be connected to conductors 109, which may perform the functions of receiving data, transmitting data, and modem control.

Figure 3:
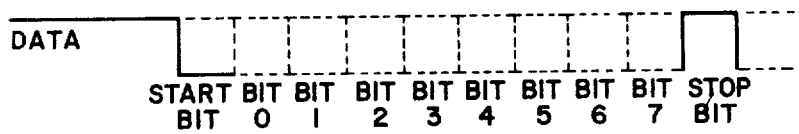
FIG. 3 is a diagram of a serial data word format and is useful in explaining the invention.

As asynchronous communications interface adaptor according to the invention provides the communications data formatting function as well as the means for controlling a modem or other communications peripheral. It provides the required address and internal register selection logic circuitry, chip enable logic circuitry, control (R/W) logic circuitry and bus interface logic for compatibility with a microprocessing unit (MPU) chip. The ACIA performs three distinct functions: asynchronous data transmission, synchronous data reception, and limited modem control. In a presently preferred embodiment the ACIA according to the invention provides the capability to transmit and receive eight-bit or nine-bit words including optional parity bit, plus associated start and stop bits. FIG. 3 shows the serial word format including start and stop bits. Parity bits, not shown, may be inserted. A preferred design provides for separate data rates for transmitting and receiving.

ACIA chip 10 has an interrupt circuit 50 which acts on internal signals derived from three independent sources, the transmitter section, the receiver section, and the modem control interface section. The transmit data register 32 being empty will cause such an internal interrupt signal. The interrupt logic 50 is automatically reset by loading the transmitter data register from the buffer 12. The receive data register 38 being full (i.e., containing a character, i.e., word) will cause an internal interrupt signal to be generated by status register 34 on conductor 88 which will automatically be reset when received data is read, i.e., loaded by ACIA chip 10 onto bidirectional data bus 14 when R/W conductor 28 is at a logical "1". A loss of data carrier (DCD) going high) will cause a bit of status register 34 to be set, and causes the receiver section to be reset. The interrupt caused by DCD will be cleared when the status and receiver data register are read. The DCD status bit will be cleared when both the DCD input returns to a low level and the status and receiver data register have been read. A buscontrollable internal reset function, which is part of the control logic 36, is provided which resets the status buffer, clears the transmitter and receiver shift registers, and resets all counters and control logic. In addition, an automatic power-on reset system gives start-up protection until the normal bus controlled master reset is utilized during initialization. The power-on reset circuit is cleared by the bus controlled master reset function and associated circuitry.

The functional operation of the ACIA chip 10 is as follows: ACIA chip 10 consists of three-state bus drivers, receivers and multiplexers in section 12 of FIG. 1, and also includes selection or address logic 16, parity logic 46 and 54, a parallel-to-serial converter including transmit data register 32 and transmit shift register 40, a serial-to-parallel converter including receive shift register 56 and receive data register 38.

Since ACIA chip 10 may be interfaced to a microprocessing unit, as in FIG. 2, the awareness of the following information is necessary. If a preferred embodiment, the MPU utilizes a 16 bit memory address register and address bus (not shown). The data transfers are provided over an 8-bit bidirectional data bus 14'. The register select (RS) input 20 is utilized to select one of four internal ACIA register locations, i.e., 32, 34, 36, or 38 in conjunction with the R/W line 28. The ACIA chip 10 itself is selected by wire decoding three of the sixteen address lines of the microcomputer of FIG. 2 in addition to RS input 20. The R/W control line 28 determines the direction of the data flow on bidirectional data bus 14 and is used, in addition, to aid selection of the internal registers mentioned above while Enable (E) input 30 causes the input/output buffers in buffer section 12 to be enabled.

The eight-bit data bus 14 is interfaced by three-state bus drivers and receivers in section 12. Chip 10 is selected when $CS_0$ and $CS_1$ are high and $CS_2$ is low. The R/W line causes the bus drivers to be activated by E when the MPU chip is undergoing a Read operation, for examle, "reading" the ACIA chip 10 when R/W equals a logical "1", ACIA chip 10 being selected. Conversely, when the MPU is undergoing a white operation, R/W equals a logical "0", and the bus receiver circuits in section 12 are enabled. The register select (RS) input 20 selects the "data" registers (transmit data register 32 and receive data register 38) when RS equals a logical "1" and selects the status register 34 or the control register 36 when RS is equal to logical "0". The R/W line selects the "write only" registers, transmit data register 32 and control register 36 a when R/W is at a logical 0 and selects the "read only" registers, receive data register 38 and the status register 34, when R/W is equal to logical "1". The meaning of "write only" register is that such a register is only written into from the buffer section 12 and the bidirectional data bus 14 and is never read from such that the data is sent out on data bus 14; an analogous meaning is associated with the term "read only" register.

TABLE I

| Buffer Address | RS . R/W | RS . R/W | RS . R/W | RS . RW |
|---|---|---|---|---|
| Bus | Transmit Data Register | Receiver Data Register | Control Register | Status Register |
| Line Number | (Write Only) | (Read Only) | (Write Only) | (Read Only) |
| 0 | Data Bit 0 | Data Bit 0 | Clk. Divide Sel. | Rx Data Rg. Full |
| 1 | Data Bit 1 | Data Bit 1 | Clk. Divide Sel. | Tx Data Reg. Empty |
| 2 | Data Bit 2 | Data Bit 2 | Word Sel. 1 | Data Carrier Det. loss |
| 3 | Data Bit 3 | Data Bit 3 | Word Sel. 2 | Clear to Send |
| 4 | Data Bit 4 | Data Bit 4 | Word Sel. 3 | Framing Error |
| 5 | Data Bit 5 | Data Bit 5 | Tx Control 1 | Overrun (OVRN) |
| 6 | Data Bit 6 | Data Bit 6 | Tx Control 2 | Parity Error (PE) |
| 7 | Data Bit 7 | Data Bit 7 | Rx Interrupt Enable | Interrupt Request |

Table 1 defines the functions of the transmit data register 32, the receive data register 38, the control register 36, and the status register 34 for a presently preferred embodiment of the invention. The combinations of the RS and R/W inputs required to select each of the registers are indicated in the "Buffer Address" row of Table 1. The "Bus Line Number" designations refer to the conductors of bidirectional data bus 14 and the corresponding bits of the four abovementioned internal registers. Bits 0 and 1 of control register 36 are dedicated to selecting one of three divide clock ratios and to establishing a master reset function which reset all of the logic on the chip. Bits 2, 3 and 4 of control register 36 are dedicated to selecting one of eight different combinations of data word lengths, parity bits, and stop bits. Bits 5 and 6 of control register 36 control the "transmitter buffer empty" interrupt output, the state of the request-to-send (RTS) output and the transmission of a "Break" level (i.e., space). Bit 7 of the control register controls interrupts being caused by the "receiver data register full" indicator and by DCD. It should be noted that writing data into the transmit data register 32 causes the "transmit data empty" bit in status register 34 to go low and data can then be transmitted. Transfer of data therefrom causes the transmit data register empty bit to indicate empty. Upon receiving a complete character, data is automatically transferred to the empty receive data register 38 from receive shift register 56, which even causes the receive data register full bit in status register 34 to go high, allowing data to be read through bidirectional data bus 14. The nondestructive read cycle causes the "receive data register full" bit to be cleared. When the receive data register 38 is full, the automatic transfer of data from the receive shift register 56 is inhibited so that the contents of receive data register 38 remains valid.

The transmitting sequence consists of reading the ACIA status register 34 either as a result of an interrupt signal from circuit 50 or in the ACIA's turn in a "polling" sequence by the MPU of circuits connected to bidirectional data bus 14'. The transmitter data register empty status is determined, and when empty the write sequence is initiated and a character is loaded into the transmit data register 32. As soon as the transmit shift register 40 is available, the character in the transmit data register 34 is serialized and transmitted from the transmit data output 108 along with a leading start bit and a trailing stop bit or bits inserted by transmitter control circuit 42. Parity (odd or even) can be optionally added to the character by circuit 46 and will occur between the last data bit and the first stop bit. The word length can range between eight and nine bits (including parity) plus the start and stop bits in a presently preferred embodiment of the invention. Parity, word length, number of stop bits (one or two), clock divider ratio, and transmit interrupt enable can all be selected by means of the MPU bus 14' (under program control) and the ACIA control registers. A length of break (break is defined as all spaces in the serial word format, i.e., all logical "0"s) can be programmed from the MPU data bus 14'. The control bit for the break character is set to initiate "break" and reset to terminate the space condition. The bit rate of transmission is determined by the transmit clock frequency applied to line 128 and the clock divider select state is determined by the state of the first two control register bits.

Data is received by means of the receive data input 122. The leading mark-to-space transition (i.e., "1" to "0" transition) of the start bit synchronizes the internal clock generator with the timing of the data being received by means of sync (i.e., synchronizing) logic 60. False start bit deletion will insure against synchronizing on noise by insuring that a full one-half bit of the start time frame has been received before synchronizing to the bit time occurs. Two divide ratios are available in a presently preferred embodiment for purposes of bit synchronization. These are 16 and 64, the latter being for higher precision. The clock will be automatically synchronized to the theoretical data midpoint. When the character reception is complete, the character (word) will be automatically loaded into the receive data register 38 if it is empty. As the characters are being received, parity will be checked and the error indication, if any, will be available in the status register 34 which contains the following information. First, a framing error indicates the absence of the stop bit. Second, an overrun error indicates one or more characters have been lost. Third, the receive data register full indicator indicates a character has been received and is available for the MPU. Fourth, the parity error bit of status register 34 indicates the number of mark bits does not agree with the even or odd parity selected. The parity bit is stripped from the data being transferred to receiver data register 38, and in the case of a seven bit word the eighth bit will be low.

When data is transferred into the receive data register 38, the receive data register full bit of status register 34 is set and an interrupt is initiated, assuming the receiver interrupt is enabled. The MPU will then read the ACIA status register 34 to determine the source of the internal interrupt signal and whether the character is valid. The receive data register full status bit will indicate that the receive data register 38 is full and MPU chip 142 will subsequently read the receive data register 38. The interrupt and receive data register full status bit will then be reset automatically. Parity, word length, and interrupt enable are programmed via the microprocessor control bus 14' and control register 36.

If the receive data register full status bit indicates receive data register 38 is full when the incoming character is complete and ready to be transferred to receive data register 38, the transfer will be inhibited and an overrun indication will be stored in an internal overrun flip-flop. When the receive data register 38 is read, transferring the last good character prior to overrunning to the bus 14, the internal overrun indication is transferred to the status register 34 and the receive data register full status bit is set. The next successive reading of the receiver data register 38 will clear the overrun status bit unless an additional overrun has occurred in the meantime.

The interrupt status indication logic for a polled interrupt digital system according to the invention is described with reference to FIG. 4.

Figure 4:
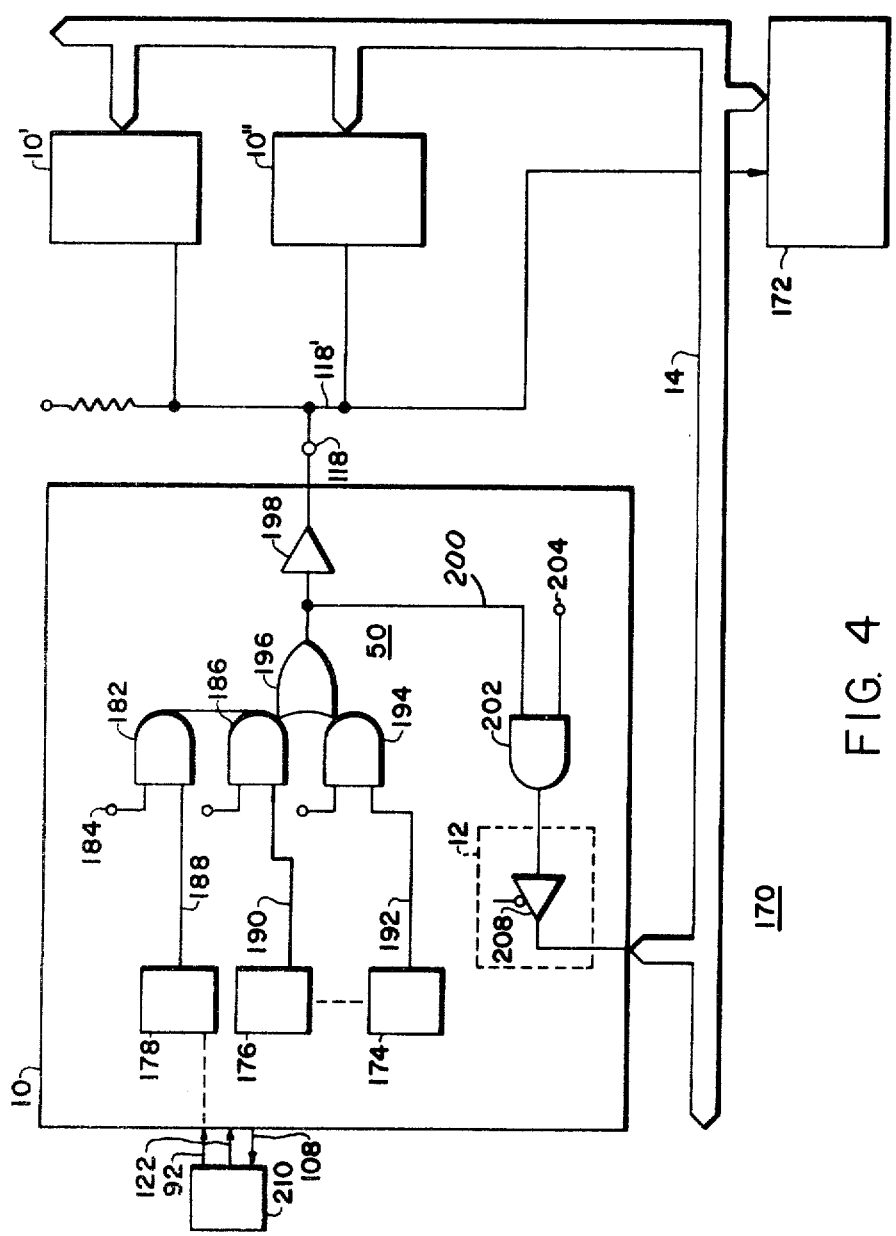
FIG. 4 is a diagram showing a logic diagram of an embodiment of the invention.

Referring to FIG. 4, digital system 170 includes a microprocessor chip 172, an interface adaptor circuit which advantageously is an asynchronous communications interface adaptor chip 10 as described above, and two additional interface adaptors 10' and 10" all coupled to bidirectional data bus 14. ACIA chip 10 is coupled to a peripheral device 210, which could be a modem, by transmitter data conductor 108, receiver data conductor 122, and DCD conductor 92. IRQ interrupt output conductor 118 is connected to a common interrupt conductor 118' connected to microprocessor unit 172 and to interrupt output conductors of interface adaptors 10, 10', and 10" each of which is normally coupled to other peripheral devices (not shown). ACIA chip 10 includes interrupt logic 50 which includes a combination of logic gates 182, 186, 194, and 196. The inputs to this combinational logic gate are conductors 188, 190 and 192, which are outputs of interrupt source circuits 178, 176, and 174, respectively. The other inputs to the combinational logic gate are interrupt enable inputs coupled to control circuitry in FIG. 1. The combinational logical gate is essentially an OR type gate which provides a signal at its output indicating whether any of the interrupt sources 178, 176, or 174 are in an "active" state, that is whether any of them are indicating an interrupt condition, and whether their respective interrupt enable is in an "active" condition. If so, an interrupt signal is sent out via IRQ conductor 118 and is detected by microprocessor 172. The interrupt indication signal also is conducted by conductor 200 to an input of gate 202, which is bit 7 of the status register 34, and (upon application of a proper read status signal at node 204, which is coupled to the other input of gate 202) is transferred to the bidirectional data bus in a preferred embodiment of the invention. If the microprocessor 172 fetches a status word, the state of conductor 200 in interrupt logic circuit 750 may be communicated via buffer circuit 208 of buffer section 12 to data bus 14 and thus to microprocessor 172 for further data processing operations thereon.

In a polled interrupt system, the MPU chip 172 recognizes an interrupt signal from the peripheral system (IRQ equals a logical "0") and responds to the interrupt signal by polling each interrupt source in the system in the course of looking for a status register of an interface adaptor chip indicating that the interrupt signal is generated thereat. The polling sequence requires multiple microprocessor instructions and machine cycles to eliminate each "port" (i.e., interface adaptor chip of some sort) on the bidirectional data bus structure until the peripheral equipment (coupled to the bidirectional data bus by means of the particular interface adaptor chip) generating the interrupt signal is located. The problem is aggrevated when a particular interface adaptor chip has multiple internal interrupt sources thereon. Then the polling operation must check the status of each possible interrupt source on the interface adaptor chip providing a potential interrupt signal as a result of an internal condition on the chip or generated by peripheral equipment. The ACIA chip 10 described herein generates such interrupt signals when the transmitter section has its data buffer in the empty state, or if the receiver section has its data register full, or if the carrier signal for received data is lost.

Provision of a status bit for indicating whether any of the interrupt sources on a particular chip are active simplifies the interrupt service routine requirements and saves machine cycles and reduces memory requirements.

The operation of the polling routine is to fetch the status word of a particular interface adaptor chip, and test for an interrupt indication. If there is no indication of an interrupt in the status word for that chip, then the polling routine addresses another interface adaptor chip. If there is an indication of an interrupt condition on that particular interface chip, then the routine tests the other bits in the status register to determine which is the particular interrupt source generating the interrupt. It should be noted that if the status register bit position holding the logical OR of the interrupt sources on the addressed chip is at a logical "1", then when the polling subroutine fetches the status word, there is no need for the MPU to perform the logical OR of the interrupt sources, which would result in destruction of the status word in the accumulator of the MPU. Therefore there is no need to re-fetch the status word if there is an interrupt on the chip.

While the invention has been described in relation to a presently preferred embodiment thereof, those skilled in the art will recognize that variations in arrangement and placement of parts may be made within the scope of the invention to suit various requirements.

What is claimed is:

1. An interface adaptor for interfacing between a peripheral device and a processor means, said interface adaptor being coupled to said processor means with a first external data bus and to said peripheral device with a second external data bus, said interface adaptor comprising:
   a plurality of first data bus terminals for coupling said interface adaptor to said first external data bus;
   a first internal data bus coupled to said first data bus terminals;
   a plurality of second data bus terminals for coupling said interface adaptor to said second external data bus;
   a second internal data bus coupled to said second data bus terminals;
   first register storage means coupled to said second internal data bus for receiving first serial data from said peripheral device;
   first circuit means coupled to said first register storage means for detecting when said first register storage means is full;
   status register storage means comprising a plurality of status bits, said status register storage means being coupled to said first internal data bus and responsive to said first circuit means for storing first information indicative of whether said first register storage means is full as a first status bit therein, said status register storage means being addressable by said processor means and including means for transferring said first information to said processor means via said first internal data bus, said first data bus terminals, and said first external data bus upon interrogation by said processor means;
   address means responsive to said processor means and coupled to said status register storage means for effecting said addressing of said status register means;
   an interrupt request conductor coupled to said processor means;
   interrupt means responsive to said status register storage means and coupled to said status register storage means and to said interrupt request conductor for generating an interrupt request signal on said interrupt request conductor in response to said storing of said first information.

2. The interface adaptor as recited in claim 1 further including:
   second register storage means coupled to said second internal data bus for sending second serial data to said peripheral device;
   second circuit means coupled to said second register storage means, said interrupt means, and said status register storage means for detecting when said second register storage means is empty;
   said status register storage means also storing second information indicative of whether said second register storage means is empty as a second status bit therein;
   said interrupt means also generating an interrupt request signal on said interrupt request conductor in response to said storing of said second information.

3. The interface adaptor as recited in claim 2 further including an additional conductor for conducting a signal indicative of whether a data carrier signal has been lost, wherein said status register storage means is coupled to said additional conductor and wherein said status register storage means stores third information indicative of whether said data carrier signal has been lost as a third status bit therein, said interrupt means also generating an interrupt request signal on said interrupt request conductor in response to said storing of said third information.

4. The interface adaptor as recited in claim 3 wherein said status register storage means has a plurality of outputs corresponding to said status bits thereof and said interrupt means includes a combinational OR-type logic gate having as inputs the outputs of said status register storage means, and having an output coupled to said interrupt request conductor and to said status register storage means so that the occurrence of any one of the events including said storage of said first information, said storage of said second information, and said storage of said third information is stored in said status register storage means and causes the generation of said interrupt request signal on said interrupt request conductor.

5. A method of operating an interface adaptor in a system including a processor means, said processor means including means for generating a request for information to be transmitted to said processor means from said interface adaptor, a peripheral device, said interface adaptor being coupled to said processor means with a first data bus and an interrupt request conductor and being coupled to said peripheral device with a second data bus, said interface adaptor including transmit register storage means coupled to said second data bus for transmitting serial data to said peripheral device, receive register storage means coupled to said second data bus for receiving data in serial format from said peripheral device, status register storage means coupled to said first data bus, to said transmit register storage means, and to said receive register storage means, and an interrupt request conductor coupled to said processor means, said method comprising the steps of:
   detecting whether said transmit register storage means is empty;

storing information in said status register storage means indicative of whether said transmit register storage means is empty;
detecting whether said receive register storage means is full;
storing information in said status register storage means indicative of whether said receive register storage means is full;
generating an interrupt request signal in response to said status register storage means if either said status register storage means contains information indicating that said transmit register storage means is empty or said receive register storage means is full;
transmitting said interrupt request signal to said processor means via said interrupt request conductor; and
transmitting the contents of said status register storage means to said processor means via said first data bus only upon receipt of said request generated by said processor means.

* * * * *